US012726969B2

(12) United States Patent
Liu

(10) Patent No.: US 12,726,969 B2
(45) Date of Patent: Sep. 1, 2026

(54) METHOD AND APPARATUS FOR TRANSMITTING HYBRID AUTOMATIC REPEAT REQUEST (HARQ), AND COMMUNICATION DEVICE

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 374 days.

(21) Appl. No.: 18/556,491

(22) PCT Filed: Apr. 23, 2021

(86) PCT No.: PCT/CN2021/089330

§ 371 (c)(1), (2) Date: Oct. 20, 2023

(87) PCT Pub. No.: WO2022/222144

PCT Pub. Date: Oct. 27, 2022

(65) Prior Publication Data

US 2024/0205907 A1 Jun. 20, 2024

(51) Int. Cl.

| | |
|---|---|
| ***H04W 72/11*** | (2023.01) |
| ***H04L 1/1812*** | (2023.01) |
| ***H04L 5/00*** | (2006.01) |
| ***H04W 72/1273*** | (2023.01) |

(52) U.S. Cl.

CPC ........... *H04W 72/11* (2023.01); *H04L 1/1812* (2013.01); *H04L 5/0053* (2013.01); *H04W 72/1273* (2013.01)

(58) Field of Classification Search

CPC . H04W 72/11; H04W 72/1273; H04L 1/1812; H04L 5/0053; H04L 1/1854; H04L 5/0055; H04L 1/1861; H04L 1/1864; H04L 1/16

See application file for complete search history.

(56) References Cited

U.S. PATENT DOCUMENTS

| | | | | |
|---|---|---|---|---|
| 10,447,460 | B2 * | 10/2019 | Lee | H04L 1/1854 |
| 2018/0331792 | A1 * | 11/2018 | Yang | H04L 5/0044 |
| 2022/0094484 | A1 * | 3/2022 | Babaei | H04W 72/1263 |

(Continued)

FOREIGN PATENT DOCUMENTS

| | | | |
|---|---|---|---|
| CN | 111106903 | A | 5/2020 |
| CN | 111262663 | A | 6/2020 |

(Continued)

OTHER PUBLICATIONS

CATT. "R1-2102628 UE feedback enhancements for HARQ-ACK" *3GPP TSG RAN WGI* #104b-e, Apr. 7, 2021 (Apr. 7, 2021).section 2.3.

(Continued)

*Primary Examiner* — Sharmin Chowdhury

(74) *Attorney, Agent, or Firm* — Volpe Koenig

(57) ABSTRACT

The present disclosure provides a method for transmitting a hybrid automatic repeat request (HARQ). The method includes: by means of user equipment (UE), receiving a plurality of downlink semi-persistent scheduling physical downlink shared channel (SPS PDSCH) resources, and performing joint reporting from among N of the plurality of SPS PDSCH resources by using N as granularity.

19 Claims, 6 Drawing Sheets

(56) References Cited

U.S. PATENT DOCUMENTS

| | | | | |
|---|---|---|---|---|
| 2022/0201724 | A1* | 6/2022 | Zhang | H04L 1/1896 |
| 2022/0346104 | A1* | 10/2022 | Yi | H04L 1/1614 |
| 2023/0093477 | A1* | 3/2023 | El Hamss | H04L 1/1861<br>370/329 |
| 2023/0179344 | A1* | 6/2023 | Dimou | H04B 7/06952<br>370/329 |
| 2023/0361938 | A1* | 11/2023 | He | H04W 72/232 |

FOREIGN PATENT DOCUMENTS

| | | | |
|---|---|---|---|
| CN | 111600684 | A | 8/2020 |
| CN | 111865506 | A | 10/2020 |
| WO | 2020011109 | A1 | 1/2020 |
| WO | 2020/221303 | A1 | 11/2020 |

OTHER PUBLICATIONS

Intel Corp. "R1-2103027 Further details on UE HARQ feedback enhancements" *3GPP TSG RAN WGI* #104-bis-e, Apr. 7, 2021 (Apr. 7, 2021Apr. 7, ). section 5.

ETRI. "R1-2103325 UE feedback enhancements for HARQ-ACK" *3GPP TSG RAN WGI* #104b-e, Apr. 6, 2021 (Apr. 6, 2021).section 2.1.3.

Apple Inc., "Discussion on UE feedback enhancements for HARQ-ACK", 3GPP TSG-RAN WG1 Meeting #104-e, R1-2101378,e-Meeting, Jan. 25-Feb. 5, 2021.

* cited by examiner

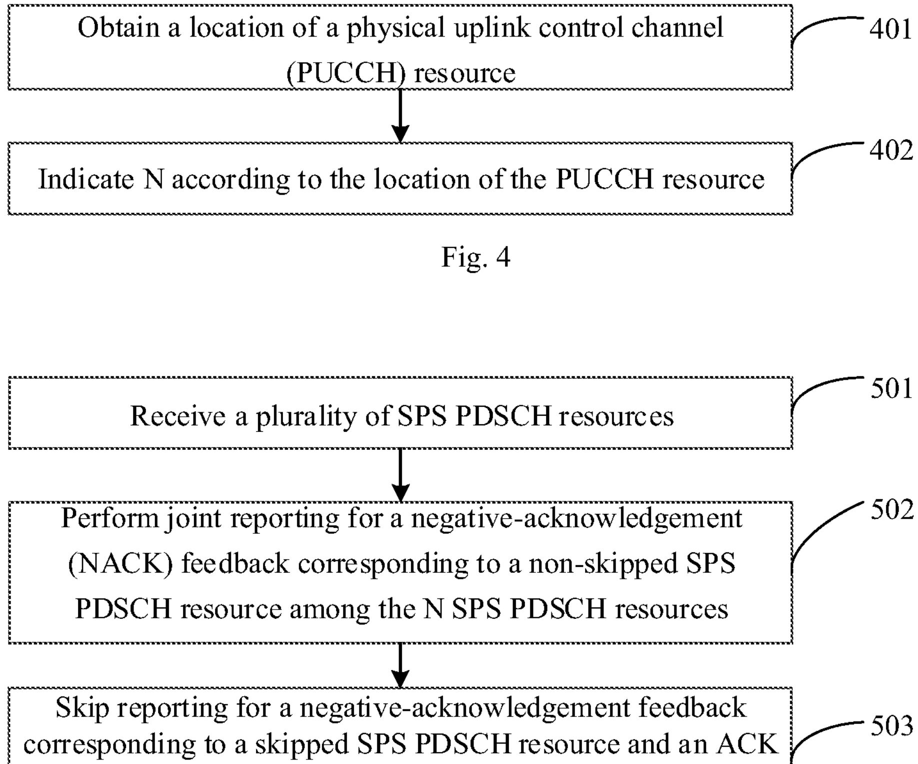
Fig. 4
Fig. 5
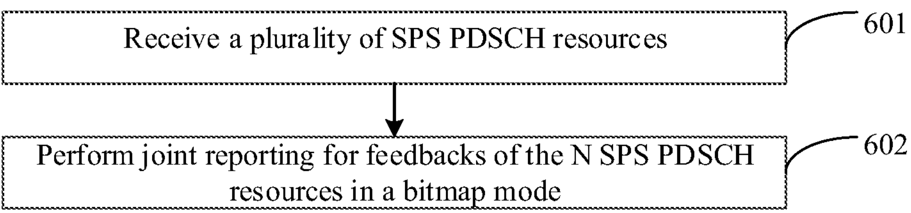
Fig. 6

METHOD AND APPARATUS FOR TRANSMITTING HYBRID AUTOMATIC REPEAT REQUEST (HARQ), AND COMMUNICATION DEVICE

CROSS REFERENCE TO RELATED APPLICATION

The present application is a U.S. National Stage of International Application No. PCT/CN2021/089330, filed on Apr. 23, 2021, the entire content of which is incorporated herein by reference for all purposes.

BACKGROUND

In an ultra-reliable and low latency communication (URLLC) subject of Release-17 (R17), enhancement on user equipment (UE) hybrid automatic repeat request acknowledgement (HARQ-ACK) feedback is proposed, which is mainly for a downlink semi-persistent scheduling (SPS) physical downlink shared channel (PDSCH). In an R16 SPS PDSCH, for each SPS PDSCH, UE has to perform HARQ-ACK feedback. However, in R17, a base station may perform skipping operation on some SPS PDSCH resources.

SUMMARY

An example of a first aspect of the disclosure provides a method for transmitting a hybrid automatic repeat request (HARQ), including: receiving a plurality of downlink semi-persistent scheduling physical downlink shared channel (SPS PDSCH) resources; and performing joint reporting from among the plurality of SPS PDSCH resources by using N as granularity, where N is a positive integer greater than 1.

An example of a second aspect of the disclosure provides a method for transmitting a hybrid automatic repeat request (HARQ), applied to a network device and including: sending a plurality of downlink semi-persistent scheduling physical downlink shared channel (SPS PDSCH) resources to UE; and obtaining feedback information of performing joint reporting from among the plurality of SPS PDSCH resources by using N as the granularity, where N is a positive integer greater than 1.

An example of a third aspect of the disclosure provides a communication device, including: a transceiver; a memory; and a processor, connected with the transceiver and the memory respectively, configured to control wireless signal transceiving of the transceiver by executing a computer executable instruction on the memory and able to implement the method for transmitting the hybrid automatic repeat request (HARQ) provided by the example of the first aspect of the disclosure or implement the method for transmitting the hybrid automatic repeat request (HARQ) provided by the example of the second aspect of the disclosure.

An example of a fourth aspect of the disclosure provides a non-transitory computer-readable storage medium, where the computer storage medium stores a computer executable instruction, and the computer executable instruction, after being executed by a processor, is able to implement the method for transmitting the hybrid automatic repeat request (HARQ) provided by the example of the first aspect of the disclosure or implement the method for transmitting the hybrid automatic repeat request (HARQ) provided by the example of the second aspect of the disclosure.

An example of a fifth aspect of the disclosure provides a computer program product, including: a computer program, and the computer program, when executed by a processor, implements the method for transmitting the hybrid automatic repeat request (HARQ) provided by the example of the first aspect of the disclosure or implements the method for transmitting the hybrid automatic repeat request (HARQ) provided by the example of the second aspect of the disclosure.

Additional aspects and strengths of the disclosure will be given partly in the following description, and a part of them will become clear in the following description or will be known by practicing the disclosure.

BRIEF DESCRIPTION OF THE DRAWINGS

The above and/or additional aspects and strengths of the disclosure will become clear and easy to understand from the following description of examples with reference to accompanying drawings.

FIG. 4 is a schematic flowchart of another method for transmitting a HARQ provided by an example of the disclosure.

FIG. 5 is a schematic flowchart of another method for transmitting a HARQ provided by an example of the disclosure.

FIG. 6 is a schematic flowchart of another method for transmitting a HARQ provided by an example of the disclosure.

DETAILED DESCRIPTION

Figure 1:
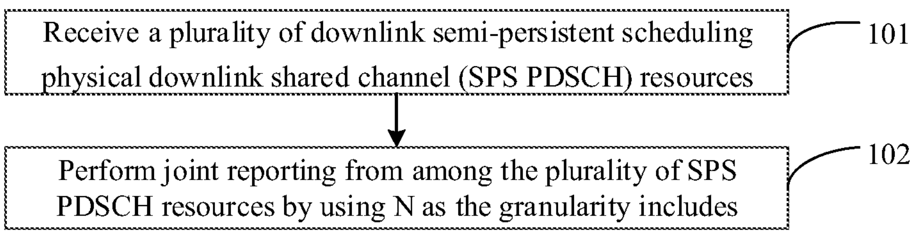
FIG. 1 is a schematic flowchart of a method for transmitting a hybrid automatic repeat request (HARQ) provided by an example of the disclosure.

The examples will be described in detail here, and their instances are represented in the accompanying drawings. Unless otherwise indicated, when the following description refers to the accompanying drawings, the same numbers in the different accompanying drawings represent the same or similar elements. Implementations described in the following examples do not represent all implementations consistent with the examples of the disclosure. Rather, they are merely examples of an apparatus and method consistent with some aspects of the examples of the disclosure as detailed in the appended claims.

Terms used in the examples of the disclosure are merely intended to describe specific examples but not to limit the examples of the disclosure. "A/an" and "said" of a singular form used in the examples and the appended claims of the disclosure are also intended to include a plural form unless other meanings are indicated clearly in the context. It is to be further understood that a term "and/or" used here refers to and contains any one or all possible combinations of one or more associated listed items.

It is to be understood that various pieces of information, possible described by using terms such as first, second and third in the examples of the disclosure, are not limited to these terms. These terms are merely used for distinguishing the same type of information from one another. For example, first information may also be called second information in a case of not departing from the scope of the examples of the disclosure, and similarly, the second information may also be called the first information. Depending on the context, words such as "if" and "in a case that" used here may be construed as "when", or "while" or "in response to determining".

The examples of the disclosure are described in detail below, instances of the examples are shown in the accompanying drawings, and the same or similar reference numerals represent the same or similar elements all the time. The examples described with reference to the accompanying drawings below are examples and are intended to explain the disclosure but are not understood as a limitation on the disclosure.

The disclosure relates to the technical field of wireless communications, in particular to a method and apparatus for transmitting a hybrid automatic repeat request (HARQ), and a communication device.

In an ultra-reliable and low latency communication (URLLC) subject of Release-17 (R17), enhancement on user equipment (UE) hybrid automatic repeat request acknowledgement (HARQ-ACK) feedback is proposed, which is mainly for a downlink semi-persistent scheduling (SPS) physical downlink shared channel (PDSCH). In a Release-16 (R16) SPS PDSCH, for each SPS PDSCH, UE has to perform HARQ-ACK feedback. However, in R17, a base station may perform skipping operation on some SPS PDSCH resources, namely, the base station has no actual transmission on some SPS PDSCH resources, and in case that the UE is forced to perform NACK feedback, the feedback overhead of the SPS PDSCH is high.

As for the above problems, the disclosure provides a method and apparatus for transmitting a hybrid automatic repeat request (HARQ), and a communication device.

An example of a first aspect of the disclosure provides a method for transmitting a hybrid automatic repeat request (HARQ), including: receiving a plurality of downlink semi-persistent scheduling physical downlink shared channel (SPS PDSCH) resources; and performing joint reporting from among the plurality of SPS PDSCH resources by using N as granularity, where N is a positive integer greater than 1.

In an example, grouping binding is performed on N SPS PDSCH resources by a network device.

In an example, N is stipulated by a protocol and is one or a plurality of candidate values.

In an example, N is determined by the network device through explicit indication.

In an example, determining N by the network device through explicit indication includes: receiving a candidate value set sent by the network device, where the candidate value set includes a plurality of candidate values; and receiving first configuration signaling sent by the network device, and selecting N from the plurality of candidate values according to the first configuration signaling.

In an example, N has various types of indication granularity.

In an example, the first configuration signaling is used for indicating one or more UE, where the one or more UE includes at least one of the following: a single SPS PDSCH configuration of single UE; single UE; a plurality of UE in one group; or a plurality of UE in a cell.

In an example, N is determined through implicit indication.

In an example, determining N through implicit indication includes: obtaining a cycle of the SPS PDSCH resources; and determining N according to the cycle of the SPS PDSCH resources.

In an example, determining N through implicit indication includes: obtaining a location of a physical uplink control channel (PUCCH) resource; and indicating N according to the location of the PUCCH resource.

In an example, performing joint reporting from among the plurality of SPS PDSCH resources by using N as the granularity includes: performing joint reporting for a negative-acknowledgement (NACK) feedback corresponding to a non-skipped SPS PDSCH resource among the N SPS PDSCH resources.

In an example, skipping reporting for a negative-acknowledgement (NACK) corresponding to a skipped SPS PDSCH resource and an ACK feedback corresponding to the non-skipped SPS PDSCH among the N SPS PDSCH resources.

In an example, performing joint reporting from among the plurality of SPS PDSCH resources by using N as the granularity includes: performing joint reporting for feedbacks of the N SPS PDSCH resources in a bitmap mode.

In an example, among the N SPS PDSCH resources, each SPS PDSCH corresponds to one bit in the bitmap, a location at the non-skipped SPS PDSCH and corresponding to the NACK feedback corresponds to a first mark, and other locations correspond to a second mark, where the first mark is different from the second mark.

In an example, performing joint reporting from among the plurality of SPS PDSCH resources by using N as the granularity includes: reporting a location index of the NACK feedback in response to the NACK feedback of a non-skipped SPS PDSCH occurring one time among the N SPS PDSCH resources; and performing reporting according to a preset format in response to the NACK feedback of the non-skipped SPS PDSCH occurring many times among the N SPS PDSCH resources.

In an example, performing joint reporting by selecting feedbacks of the N SPS PDSCH resources from among the plurality of SPS PDSCH resources includes: obtaining the number M of times of actual transmission of the non-skipped SPS PDSCH among the N SPS PDSCH resources; reporting a location index of the NACK feedback in response to the NACK feedback occurring one time among the M times of actual transmission of the non-skipped SPS PDSCH; and performing reporting according to a preset format in response to the NACK feedback occurring many times among the M times of actual transmission of the non-skipped SPS PDSCH.

In an example, performing joint reporting for the feedbacks of the N SPS PDSCH resources in the bitmap mode includes: obtaining the number M of times of actual transmission of the non-skipped SPS PDSCH among the N SPS PDSCH resources; and generating a bitmap with M bits, where in the bitmap with the M bits, a location at the non-skipped SPS PDSCH and corresponding to the NACK feedback corresponds to a first mark, and other locations of the bitmap correspond to a second mark.

In an example, obtaining the number M of times of actual transmission of the non-skipped SPS PDSCH among the N SPS PDSCH resources includes: obtaining transmission power of each non-skipped SPS PDSCH among the N SPS PDSCH resources; and judging that actual transmission is performed once in response to the transmission power of each non-skipped SPS PDSCH being greater than a preset threshold.

In an example, obtaining the number M of times of actual transmission of the non-skipped SPS PDSCH among the N SPS PDSCH resources includes: obtaining a demodulation reference signal (DMRS) of each non-skipped SPS PDSCH among the N SPS PDSCH resources; and obtaining the number M of times of actual transmission according to the demodulation reference signal (DMRS) of each non-skipped SPS PDSCH.

In an example, M is obtained by the network device through explicit indication.

In an example, M is obtained by the network device through implicit indication.

In an example, M is determined through a feedback timing parameter K1 value corresponding to an SPS PDSCH of actual transmission.

An example of a second aspect of the disclosure provides a method for transmitting a hybrid automatic repeat request (HARQ), applied to a network device and including: sending a plurality of downlink semi-persistent scheduling physical downlink shared channel (SPS PDSCH) resources to UE; and obtaining feedback information of performing joint reporting from among the plurality of SPS PDSCH resources by using N as the granularity, where N is a positive integer greater than 1.

In an example, the method includes: performing grouping binding on the N SPS PDSCH resources.

In an example, N is stipulated by a protocol and may be one or more candidate values.

In an example, the method further includes: determining N in an explicit indication mode.

In an example, determining N in the explicit indication mode includes: sending a candidate value set to the UE, where the candidate value set includes a plurality of candidate values; and sending first configuration signaling to the UE, where the first configuration signaling is used for selecting N from the plurality of candidate values.

In an example, N has various types of indication granularity.

In an example, the first configuration signaling is used for indicating one or more UE, where the one or more UE includes at least one of the following: a single SPS PDSCH configuration of single UE; single UE; a plurality of UE in a group; or a plurality of UE in a cell.

In an example, N is determined through implicit indication.

An example of a third aspect of the disclosure provides an apparatus for transmitting a hybrid automatic repeat request (HARQ), including: a receiving module, configured to transmit the hybrid automatic repeat request (HARQ); and a reporting module, configured to perform joint reporting from a plurality of SPS PDSCH resources by using N as the granularity, where N is a positive integer greater than 1.

An example of a fourth aspect of the disclosure provides an apparatus for transmitting a hybrid automatic repeat request (HARQ), including: a sending module, configured to send a plurality of downlink semi-persistent scheduling physical downlink shared channel (SPS PDSCH) resources to UE; and an obtaining module, configured to obtain feedback information of performing joint reporting from among the plurality of SPS PDSCH resources by using N as the granularity, where N is a positive integer greater than 1.

An example of a fifth aspect of the disclosure provides a communication device, including: a transceiver; a memory; and a processor, connected with the transceiver and the memory respectively, configured to control wireless signal transceiving of the transceiver by executing a computer executable instruction on the memory and able to implement the method for transmitting the hybrid automatic repeat request (HARQ) provided by the example of the first aspect of the disclosure or implement the method for transmitting the hybrid automatic repeat request (HARQ) provided by the example of the second aspect of the disclosure.

An example of a sixth aspect of the disclosure provides a non-transitory computer-readable storage medium, where the computer storage medium stores a computer executable instruction, and the computer executable instruction, after being executed by a processor, is able to implement the method for transmitting the hybrid automatic repeat request (HARQ) provided by the example of the first aspect of the disclosure or implement the method for transmitting the hybrid automatic repeat request (HARQ) provided by the example of the second aspect of the disclosure.

An example of a seventh aspect of the disclosure provides a computer program product, including: a computer program, and the computer program, when executed by a processor, implements the method for transmitting the hybrid automatic repeat request (HARQ) provided by the example of the first aspect of the disclosure or implements the method for transmitting the hybrid automatic repeat request (HARQ) provided by the example of the second aspect of the disclosure.

According to the method and apparatus for transmitting the hybrid automatic repeat request (HARQ), and the communication device provided by the examples of the disclosure, the plurality of SPS PDSCH resources are received through the UE; and joint reporting is performed from among the plurality of SPS PDSCH resources by using N as the granularity, where N is a positive integer greater than 1.

Additional aspects and strengths of the disclosure will be given partly in the following description, and a part of them will become clear in the following description or will be known by practicing the disclosure.

FIG. 1 is a schematic flowchart of a method for transmitting a hybrid automatic repeat request (HARQ) provided by an example of the disclosure. The method for transmitting the hybrid automatic repeat request (HARQ) may be performed by user equipment (UE).

A terminal device may refer to a device providing voice and/or data connectivity for a user, such as a hand-held device with a wireless connection function or other processing devices connected to a radio modem. In different systems, names of the terminal device may also be different, for example, in a 5G system, the terminal device may be called UE. The wireless terminal device may communicate with one or more core networks (CNs) via a radio access network (RAN), the wireless terminal device may be a mobile terminal device, for example, a mobile phone (or called "cellular" phone) and a computer with the mobile terminal device, for example, may be portable, pocket, hand-held, built-in-computer or vehicle-mounted mobile devices, which exchange language and/or data with the radio access network.

For example, the terminal device may be a personal communication service (PCS) phone, a cordless telephone, a session initiated protocol (SIP) phone, a wireless local loop (WLL) station, a personal digital assistant (PDA) and other devices. The wireless terminal device may also be called a system, a subscriber unit, a subscriber station, a mobile station, a mobile, a remote station, an access point, a remote terminal, an access terminal, a user terminal, a user agent and a user device, which is not limited in the examples of the disclosure.

As shown in FIG. 1, the method for transmitting the hybrid automatic repeat request (HARQ) may include steps 101 and 102.

Step 101: a plurality of downlink semi-persistent scheduling physical downlink shared channel (SPS PDSCH) resources are received.

SPS refers to, after UE applies for a resource once, periodically allocating corresponding resources to a user within a period of time.

In the example of the disclosure, the UE may receive the plurality of downlink SPS PDSCH resources sent by a network device.

Step 102: joint reporting is performed from among the plurality of SPS PDSCH resources by using N as the granularity, where N is a positive integer greater than 1.

In the example of the disclosure, the UE, after receiving the plurality of SPS PDSCH resources, may perform joint reporting from among the plurality of SPS PDSCH resources by using N as the granularity.

In a possible case, grouping binding may be performed on the N SPS PDSCH resources by the network device.

As an example, it is assumed that N is 5, the network device may bind the five continuous SPS PDSCH resources, so HARQ-ACK feedback of the five SPS PDSCH resources is performed together.

In another possible case, N may be stipulated by a protocol and may be one or more candidate values. As an example, the protocol may stipulate a fixed N value, for example, the protocol stipulates that N is 4. For another example, the protocol may stipulate a candidate N set, such as N={2, 4, 6, 8}.

In yet another possible case, an N value may be determined by the network device in an explicit indication mode. In yet another possible case, an N value may also be determined in an implicit indication mode.

The network device being a base station is taken as an example. The base station may include a plurality of cells providing services for a terminal device. According to different specific application occasions, each cell may further contain a plurality of transmitting receiving points (TRPs), or may be a device in an access network communicating with a wireless terminal device through one or more sectors on an air interface, or other names. For example, the base station involved in the example of the disclosure may be a base transceiver station (BTS) in a global system for mobile communications (GSM) or code division multiple access (CDMA), or may also be a NodeB in a wide-band code division multiple access (WCDMA), or may also be an evolution Node B (eNB or e-NodeB for short) in a long term evolution (LTE) system, a 5G base station (gNB for short) in a 5G network architecture (next generation system), or may also be a home evolved Node B (HeNB), a relay node, a femto, a pico or the like, which is not limited in the example of the disclosure.

According to the method for transmitting the hybrid automatic repeat request (HARQ) in the example of the disclosure, the plurality of SPS PDSCH resources are received through the UE; and joint reporting is performed from among the plurality of SPS PDSCH resources by using N as the granularity. Since jointly reporting HARQ-ACK feedback is performed from among the plurality of SPS PDSCH resources by using N as the granularity, a reduction in HARQ-ACK feedback overhead is facilitated.

It is to be noted that the above possible implementations may be executed independently, or be executed in a combining mode, which is not limited in the example of the disclosure.

Figure 2:
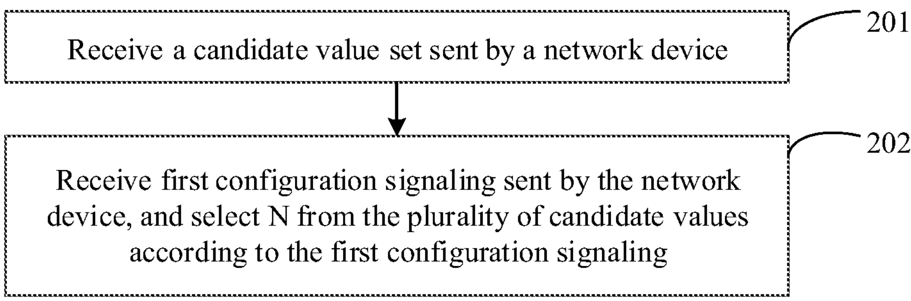
FIG. 2 is a schematic flowchart of another method for transmitting a HARQ provided by an example of the disclosure.

An example of the disclosure provides another method for transmitting a HARQ. FIG. 2 is a schematic flowchart of another method for transmitting a HARQ provided by an example of the disclosure. The method for transmitting the hybrid automatic repeat request (HARQ) may be performed by UE. The method for transmitting the HARQ may be executed independently, or be executed by combining with any example or a possible implementation in the example in the disclosure, or be executed by combining with any technical solution in the related art. As shown in FIG. 2, the method for transmitting the HARQ may include steps 201 and 202.

Step 201: a candidate value set sent by a network device is received. The candidate value set includes a plurality of candidate values.

In the example of the disclosure, the network device may determine N in an explicit indication mode or indicate the plurality of candidate values included in the candidate value set in an explicit indication mode.

In a possible case, the network device may configure the candidate value set by using a radio resource control (RRC) parameter.

In another possible case, the network device may also configure the candidate value set by using a medium access control (MAC) control element (CE) parameter.

In yet another possible case, the network device may also configure the candidate value set by using a downlink control information (DCI) parameter.

It is to be noted that the above mode for configuring the candidate value set is merely used as an exemplary description, and any implementable mode is suitable for the example, which is not limited here.

Step 202: first configuration signaling sent by the network device is received, and N is selected from among the plurality of candidate values according to the first configuration signaling.

In the example of the disclosure, the UE, after receiving the first configuration signaling sent by the network device, may select N from the plurality of candidate values according to the first configuration signaling.

As an example, it is assumed that the candidate value set is N={2, 4, 6, 8}, and the UE, after receiving the first configuration signaling, may determine that N is 6 from the candidate value set.

N has various types of indication granularity.

In the example of the disclosure, the first configuration signaling is used for indicating one or more UE. The one or more UE includes at least one of the following: a single SPS PDSCH configuration of single UE; single UE; a plurality of UE in a group; or a plurality of UE in a cell.

According to the method for transmitting the HARQ in the example of the disclosure, the first configuration signaling sent by the network device is received by receiving the candidate value set sent by the network device, and N is selected from among the plurality of candidate values according to the first configuration signaling. Thus, N is determined in an explicit mode, jointly reporting HARQ-ACK feedback is performed from among the plurality of SPS PDSCH resources by using N as the granularity, and a reduction in HARQ-ACK feedback overhead is facilitated.

It is to be noted that the above possible implementations may be executed independently, or be executed in a combining mode, which is not limited in the example of the disclosure.

Figure 3:
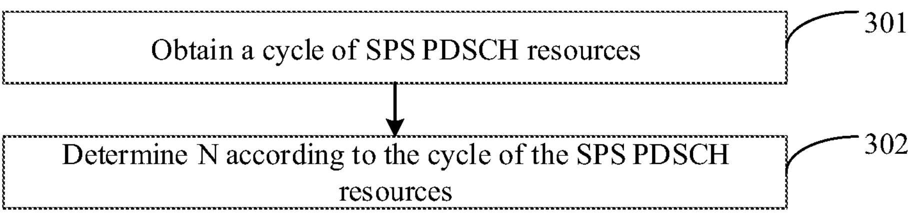
FIG. 3 is a schematic flowchart of another method for transmitting a HARQ provided by an example of the disclosure.

An example of the disclosure provides another method for transmitting a HARQ. FIG. 3 is a schematic flowchart of another method for transmitting a HARQ provided by an example of the disclosure. The method for transmitting the HARQ may be performed by UE. The method for transmitting the HARQ may be executed independently, or be executed by combining with any example or a possible implementation in the example in the disclosure, or be executed by combining with any technical solution in the related art. As shown in FIG. 3, the method for transmitting the HARQ may include steps 301 and 302.

Step 301: a cycle of SPS PDSCH resources is obtained.

In the example of the disclosure, N may also be determined in an implicit indication mode.

In the example of the disclosure, N may be bound to the cycle of the SPS PDSCH resources, so that the cycle of the SPS PDSCH resources may be obtained.

Step 302: N is determined according to the cycle of the SPS PDSCH resources.

In the example of the disclosure, after obtaining the cycle of the SPS PDSCH resources, N may be determined according to the cycle of the SPS PDSCH resources. Thus, determining N in an implicit mode is implemented.

It is to be noted that the above possible implementations may be executed independently, or be executed in a combining mode, which is not limited in the example of the disclosure.

An example of the disclosure provides another method for transmitting a HARQ. FIG. 4 is a schematic flowchart of another method for transmitting the HARQ provided by an example of the disclosure. The method for transmitting the HARQ may be performed by UE. The method for transmitting the HARQ may be executed independently, or be executed by combining with any example or a possible implementation in the example in the disclosure, or be executed by combining with any technical solution in the related art. As shown in FIG. 4, the method for transmitting the HARQ may include steps 401 and 402.

Step 401: a location of a physical uplink control channel (PUCCH) resource is obtained.

In the example of the disclosure, the UE may obtain the location of the physical uplink control channel (PUCCH) resource, where the location of the PUCCH resource carries indication information for indicating N.

Step 402: N is indicated according to the location of the PUCCH resource.

In the example of the disclosure, the UE, after obtaining the location of the PUCCH resource, may determine N according to the location of the PUCCH resource.

As an example, it is assumed that N bound to the location of the PUCCH resource is 4, it may be indicated that N is 4 according to the location of the PUCCH resource. Thus, indicating N in an implicit mode is implemented. Further, jointly reporting HARQ-ACK feedback is performed from among the plurality of SPS PDSCH resources by using N as the granularity. Therefore, a reduction in HARQ-ACK feedback overhead is facilitated.

It is to be noted that the above possible implementations may be executed independently, or be executed in a combining mode, which is not limited in the example of the disclosure.

An example of the disclosure provides another method for transmitting a HARQ. FIG. 5 is a schematic flowchart of another method for transmitting a HARQ provided by an example of the disclosure. The method for transmitting the HARQ may be performed by UE. The method for transmitting the HARQ may be executed independently, or be executed by combining with any example or a possible implementation in the example in the disclosure, or be executed by combining with any technical solution in the related art. As shown in FIG. 5, the method for transmitting the HARQ may include steps 501-503.

Step 501: a plurality of SPS PDSCH resources are received.

Step 502: joint reporting is performed for a negative-acknowledgement (NACK) feedback corresponding to a non-skipped SPS PDSCH resource among the N SPS PDSCH resources.

In the example of the disclosure, after the UE receives the plurality of SPS PDSCH resources, the non-skipped SPS PDSCH resource and a skipped SPS PDSCH resource may exist among the N SPS PDSCH resources.

In a possible case, joint reporting is performed for the negative-acknowledgement (NACK) feedback corresponding to the non-skipped SPS PDSCH resource.

Step 503: reporting is skipped for a NACK feedback corresponding to the skipped SPS PDSCH resource and an ACK feedback corresponding to the non-skipped SPS PDSCH among the N SPS PDSCH resources.

In another possible case, reporting is skipped for the NACK feedback corresponding to the skipped SPS PDSCH resource and the ACK feedback corresponding to the non-skipped SPS PDSCH. Thus, SPS PDSCH HARQ-ACK feedback overhead is reduced.

It is to be noted that the above possible implementations may be executed independently, or be executed in a combining mode, which is not limited in the example of the disclosure.

An example of the disclosure provides another method for transmitting a HARQ. FIG. 6 is a schematic flowchart of another method for transmitting a HARQ provided by an example of the disclosure. The method for transmitting the HARQ may be performed by UE. The method for transmitting the HARQ may be executed independently, or be executed by combining with any example or a possible implementation in the example in the disclosure, or be executed by combining with any technical solution in the related art. As shown in FIG. 6, the method for transmitting the HARQ may include steps 601 and 602.

Step 601: a plurality of SPS PDSCH resources are received.

Step 602: joint reporting is performed for feedbacks of the N SPS PDSCH resources in a bitmap mode.

In the examples of the disclosure, the UE, after receiving the plurality of SPS PDSCH resources, divides the plurality of SPS PDSCH resources into N groups and then may perform joint reporting for the feedbacks of the N SPS PDSCH resources in a bitmap mode in each group.

In the example of the disclosure, in the N SPS PDSCH resources, each SPS PDSCH corresponds to a bit in the bitmap. A location at a non-skipped SPS PDSCH and corresponding to a NACK feedback corresponds to a first mark, and other locations correspond to a second mark, where the first mark is different from the second mark.

As an example, it is assumed that each SPS PDSCH corresponds to one bit, the N SPS PDSCH resources need N bits, the location at the non-skipped SPS PDSCH and corresponding to NACK is marked as 1, and other locations are filled with 0. Or, the location at the non-skipped SPS PDSCH and corresponding to NACK is marked as 0, and other locations are filled with 1, which is not limited here.

It is to be noted that as N is certain, the feedback overhead does not change with change of the number of times of actual transmission of SPS PDSCH in N windows.

As a possible implementation, the UE may obtain the number M of times of actual transmission of the non-skipped SPS PDSCH among the N SPS PDSCH resources and generate a bitmap with M bits. In the bitmap with the M bits, the location at the non-skipped SPS PDSCH and corresponding to the NACK feedback corresponds to the first mark, and other locations of the bitmap correspond to the second mark.

As a possible implementation of the example of the disclosure, when the number M of times of actual transmission is determined, transmission power of each non-skipped SPS PDSCH among the N SPS PDSCH resources may be obtained, and it is judged that actual transmission is performed once in response to the transmission power of each non-skipped SPS PDSCH being greater than a preset threshold.

It may be understood that during actual transmission of the non-skipped SPS PDSCH, the transmission power will change, power of actually transmitting data is high, power of not transmitting data is low, and thus whether actual transmission of the SPS PDSCH resources is performed once may be determined according to the transmission power of each non-skipped SPS PDSCH among the N SPS PDSCH resources.

As another possible implementation of the example of the disclosure, when the number M of times of actual transmission is determined, a demodulation reference signal (DMRS) of each non-skipped SPS PDSCH among the N SPS PDSCH resources may also be obtained, and thus the number M of times of actual transmission is obtained according to the DMRS of each non-skipped SPS PDSCH.

It may be understood that during actual transmission of the non-skipped SPS PDSCH, the DMRS may be detected. Thus, whether actual transmission of the SPS PDSCH resources is performed once may be determined according to whether the DMRS can be detected.

As another possible implementation of the example of the disclosure, the number M of times of actual transmission may also be determined by the network device in an explicit indication mode. For example, the network device may dynamically indicate an M value directly through a DCI and indicates the M value once every N units.

As another possible implementation of the example of the disclosure, the number M of times of actual transmission may also be determined by the network device in an implicit indication mode.

In the example of the disclosure, the number M of times of actual transmission may also be determined through a feedback timing parameter K1 value corresponding to an SPS PDSCH of actual transmission.

According to the method for transmitting the HARQ in the example of the disclosure, the UE receives the plurality of SPS PDSCH resources, and performs joint reporting for feedbacks of the N SPS PDSCH resources in a bitmap mode. Thus, SPS PDSCH HARQ-ACK feedback overhead is reduced.

It is to be noted that the above possible implementations may be executed independently, or be executed in a combining mode, which is not limited in the example of the disclosure.

Figure 7:
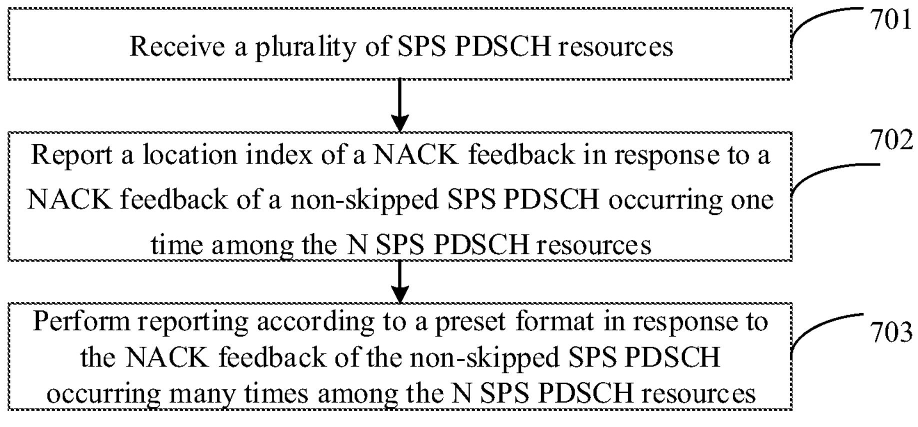
FIG. 7 is a schematic flowchart of another method for transmitting a HARQ provided by an example of the disclosure.

An example of the disclosure provides another method for transmitting a HARQ. FIG. 7 is a schematic flowchart of another method for transmitting a HARQ provided by an example of the disclosure. The method for transmitting the HARQ may be applied to UE. The method for transmitting the HARQ may be executed independently, or be executed by combining with any example or a possible implementation in the example in the disclosure, or be executed by combining with any technical solution in the related art. As shown in FIG. 7, the method for transmitting the HARQ may include steps 701-703.

Step 701: a plurality of SPS PDSCH resources are received.

Step 702: a location index of a NACK feedback is reported in response to a NACK feedback of a non-skipped SPS PDSCH occurring one time among the N SPS PDSCH resources.

In the example of the disclosure, the UE obtains the plurality of SPS PDSCH resources and divides the plurality of SPS PDSCH resources into groups by using N as the granularity. In the case that the NACK feedback of the non-skipped SPS PDSCH occurs merely one time in each group, the location index where the NACK feedback is located is reported.

Step 703: reporting is performed according to a preset format in response to the NACK feedback of the non-skipped SPS PDSCH occurring many times among the N SPS PDSCH resources.

In the example of the disclosure, the UE obtains the plurality of SPS PDSCH resources and divides the plurality of SPS PDSCH resources into groups by using N as the granularity, and in case that the NACK feedback of the non-skipped SPS PDSCH occurs many times among the N SPS PDSCH resources in one group, reporting may be performed according to the preset format. For example, all 0 or all 1 may be fed back.

It is to be noted that the above step 702 and the step 703 are not executed in sequence, and rather, whether the step 702 or the step 703 is executed is determined according to the number of times of the NACK feedback of the non-skipped SPS PDSCH among the N SPS PDSCH resources.

It is to be noted that the above possible implementations may be executed independently, or be executed in a combining mode, which is not limited in the example of the disclosure.

Figure 8:
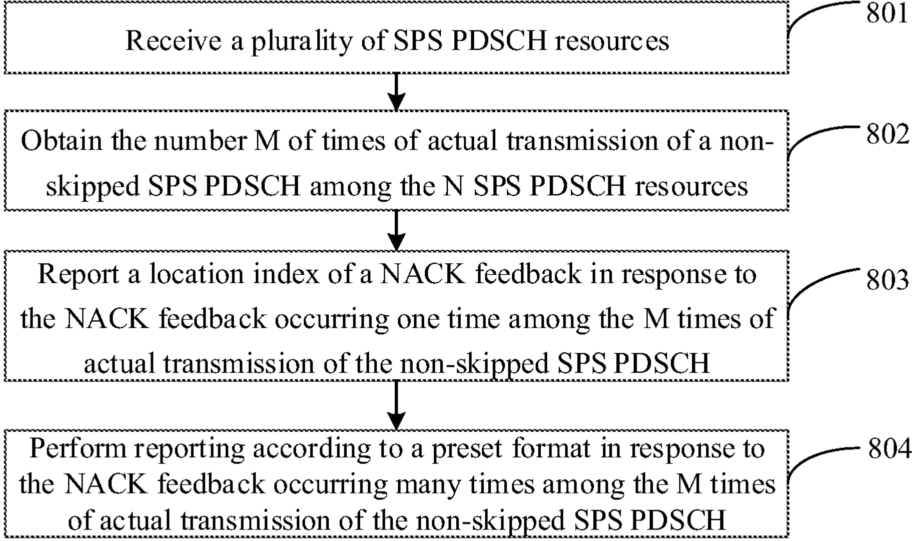
FIG. 8 is a schematic flowchart of another method for transmitting a HARQ provided by an example of the disclosure.

An example of the disclosure provides another method for transmitting a HARQ. FIG. 8 is a schematic flowchart of another method for transmitting a HARQ provided by an example of the disclosure. The method for transmitting the HARQ may be performed by UE. The method for transmitting the HARQ may be executed independently, or be executed by combining with any example or a possible implementation in the example in the disclosure, or be executed by combining with any technical solution in the related art. As shown in FIG. 8, the method for transmitting the HARQ may include steps 801-804.

Step 801: a plurality of SPS PDSCH resources are received.

Step 802: the number M of times of actual transmission of a non-skipped SPS PDSCH among the N SPS PDSCH resources is obtained.

As a possible implementation of the example of the disclosure, when the number M of times of actual transmission is determined, transmission power of each non-skipped SPS PDSCH among the N SPS PDSCH resources may be obtained, and it is judged that actual transmission is performed once in response to the transmission power of each non-skipped SPS PDSCH being greater than a preset threshold.

It may be understood that during actual transmission of the non-skipped SPS PDSCH, the transmission power will change, power of actually transmitting data is high, power of not transmitting data is low. Thus, whether actual transmission of the SPS PDSCH resources is performed once may be determined according to the transmission power of each non-skipped SPS PDSCH among the N SPS PDSCH resources.

As another possible implementation of the example of the disclosure, when the number M of times of actual transmission is determined, a demodulation reference signal (DMRS) of each non-skipped SPS PDSCH among the N SPS PDSCH resources may also be obtained. Thus, the number M of times of actual transmission is obtained according to the DMRS of each non-skipped SPS PDSCH.

It may be understood that during actual transmission of the non-skipped SPS PDSCH, the DMRS may be detected. Thus, whether actual transmission of the SPS PDSCH resources is performed once may be determined according to whether the DMRS may be detected.

As another possible implementation of the example of the disclosure, the number M of times of actual transmission may also be determined by the network device in an explicit indication mode. For example, the network device may dynamically indicate an M value directly through a DCI and indicates the M value once every N units.

As another possible implementation of the example of the disclosure, the number M of times of actual transmission may also be determined by the network device in an implicit indication mode.

In the example of the disclosure, the number M of times of actual transmission may also be determined through a feedback timing parameter K1 value corresponding to an SPS PDSCH of actual transmission.

Step 803: a location index of the NACK feedback is reported in response to the NACK feedback occurring one time among the M times of actual transmission of the non-skipped SPS PDSCH.

In the example of the disclosure, when the M times of actual transmission of the non-skipped SPS PDSCH sent in each group is determined, in case that the NACK feedback occurs merely one time, the location index of the NACK feedback is reported.

Step 804: reporting is performed according to a preset format in response to the NACK feedback occurring many times among the M times of actual transmission of the non-skipped SPS PDSCH.

In the example of the disclosure, when the M times of actual transmission of the non-skipped SPS PDSCH sent in each group is determined, in case that the NACK feedback occurs many times, reporting is performed according to the preset format. For example, all 0 or all 1 may be fed back.

According to the method for transmitting the HARQ in the example of the disclosure, the UE, after receiving the plurality of SPS PDSCH resources, obtains the number M of times of actual transmission of the non-skipped SPS PDSCH among the N SPS PDSCH resources, reports the location index of the NACK feedback in response to the NACK feedback occurring one time among the M times of actual transmission of the non-skipped SPS PDSCH and performs reporting according to the preset format in response to the NACK feedback occurring many times among the M times of actual transmission of the non-skipped SPS PDSCH. Thus, SPS PDSCH HARQ-ACK feedback overhead is reduced.

It is to be noted that the above possible implementations may be executed independently, or be executed in a combining mode, which is not limited in the example of the disclosure.

Figure 9:
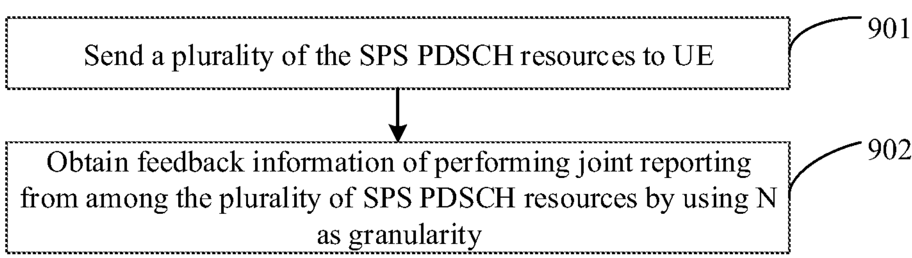
FIG. 9 is a schematic flowchart of another method for transmitting a HARQ provided by an example of the disclosure.

In order to implement the above example, the disclosure further provides another method for transmitting a HARQ. FIG. 9 is a schematic flowchart of another method for transmitting a HARQ provided by an example of the disclosure. The method for transmitting the HARQ may be performed by a network device. The method for transmitting the HARQ may be executed independently, or be executed by combining with any example or a possible implementation in the example in the disclosure, or be executed by combining with any technical solution in the related art. As shown in FIG. 9, the method for transmitting the HARQ may include steps 901 and 902.

Step 901: a plurality of SPS PDSCH resources are sent to UE.

In the example of the disclosure, the network device may send the plurality of SPS PDSCH resources to the UE. In a possible case, the network device, when sending the plurality of SPS PDSCH resources to the UE, may perform grouping binding on the N SPS PDSCH resources.

N is stipulated by a protocol and is one or more candidate values.

In the example of the disclosure, the network device may determine N in an explicit indication mode. Specifically, the network device may send a candidate value set to the UE, where the candidate value set includes a plurality of candidate values. Further, the network device may send first configuration signaling to the UE, so that the UE, after receiving the first configuration information, determines N from the plurality of candidate values according to the first configuration information. The first configuration signaling is used for selecting N from the plurality of candidate values.

In the example of the disclosure, N has various types of indication granularity.

The first configuration signaling is used for indicating one or more UE, where the one or more UE includes at least one of the following: a single SPS PDSCH configuration of single UE; the single UE; a plurality of UE in a group; or a plurality of UE in a cell.

In the example of the disclosure, N may also be determined in an implicit indication mode.

Step 902: feedback information of performing joint reporting from among the plurality of SPS PDSCH resources by using N as the granularity is obtained, where N is a positive integer greater than 1.

According to the method for transmitting the HARQ in the example of the disclosure, the network device sends the plurality of SPS PDSCH resources to the UE, and then obtains the feedback information of performing joint reporting from among the plurality of SPS PDSCH resources by using N as the granularity. Thus, the UE binds the SPS PDSCH resources, so that the SPS PDSCH HARQ-ACK feedback overhead is reduced.

It is to be noted that the explanatory description for the method for transmitting the HARQ executed by the UE in any of the above examples in FIG. 1 to FIG. 8 is also suitable for the method for transmitting the HARQ executed by the network device in this example, and their implementation principles are similar and will not be repeated here.

Corresponding to the method for transmitting the HARQ in the above example in FIG. 1 to FIG. 8, the disclosure further provides an apparatus for transmitting a HARQ. The apparatus for transmitting the HARQ provided in the example of the disclosure corresponds to the method for transmitting the HARQ provided in the above example in FIG. 1 to FIG. 8, so an implementation of the method for transmitting the HARQ is also suitable for the apparatus for transmitting the HARQ provided by the example of the disclosure, which is not described in detail in the example of the disclosure.

Figure 10:
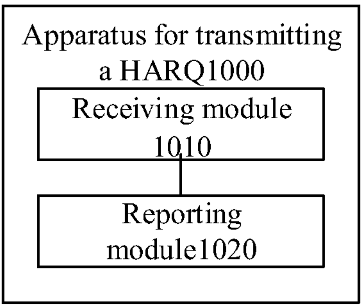
FIG. 10 is a schematic structural diagram of an apparatus for transmitting a HARQ provided by an example of the disclosure.

FIG. 10 is a schematic structural diagram of an apparatus for transmitting a HARQ 1000 provided by an example of the disclosure. The apparatus 1000 may be applied to UE. As shown in FIG. 10, the apparatus 1000 for transmitting the HARQ may include: a receiving module 1010 and a reporting module 1020.

The receiving module 1010 is configured to transmit the hybrid automatic repeat request (HARQ).

The reporting module 1020 is configured to perform joint reporting from among the plurality of SPS PDSCH resources by using N as the granularity, where N is a positive integer greater than 1.

In an example, grouping binding is performed on the N SPS PDSCH resources by a network device.

In an example, N is stipulated by a protocol and is one or more candidate values.

In an example, N is determined by the network device through explicit indication.

In an example, determining N by the network device through explicit indication includes: receiving a candidate value set sent by the network device, where the candidate value set includes a plurality of candidate values; and receiving first configuration signaling sent by the network device, and selecting N from the plurality of candidate values according to the first configuration signaling.

In an example, N has various types of indication granularity.

In an example, the first configuration signaling is used for indicating one or more UE, where the one or more UE includes at least one of the following: a single SPS PDSCH configuration of single UE; the single UE; a plurality of UE in a group; or a plurality of UE in a cell.

In an example, N is determined through implicit indication.

In an example, determining N through implicit indication includes: obtaining a cycle of the SPS PDSCH resources; and determining N according to the cycle of the SPS PDSCH resources.

In an example, determining N through implicit indication includes: obtaining a location of a physical uplink control channel (PUCCH) resource; and indicating N according to the location of the PUCCH resource.

In an example, the reporting module 1020 may be further configured to perform joint reporting for a negative-acknowledgement (NACK) feedback corresponding to a non-skipped SPS PDSCH resource among the N SPS PDSCH resources.

In an example, reporting is skipped for a negative-acknowledgement feedback corresponding to a skipped SPS PDSCH resource and an ACK feedback corresponding to the non-skipped SPS PDSCH among the N SPS PDSCH resources.

In an example, the reporting module 1020 may be further configured to perform joint reporting for feedbacks of the N SPS PDSCH resources in a bitmap mode.

In an example, among the N SPS PDSCH resources, each SPS PDSCH corresponds to one bit in the bitmap, a location at the non-skipped SPS PDSCH and corresponding to the NACK feedback corresponds to a first mark, and other locations correspond to a second mark, where the first mark is different from the second mark.

In an example, the reporting module 1020 may be further configured to report a location index of a NACK feedback in response to the NACK feedback of a non-skipped SPS PDSCH occurring one time among the N SPS PDSCH resources; and perform reporting according to a preset format in response to the NACK feedback of the non-skipped SPS PDSCH occurring many times among the N SPS PDSCH resources.

In an example, the reporting module 1020 may be further configured to obtain the number M of times of actual transmission of the non-skipped SPS PDSCH among the N SPS PDSCH resources; report a location index of the NACK feedback in response to the NACK feedback occurring one time among the M times of actual transmission of the non-skipped SPS PDSCH; and perform reporting according to a preset format in response to the NACK feedback occurring many times among the M times of actual transmission of the non-skipped SPS PDSCH.

In an example, the reporting module 1020 may be further configured to obtain the number M of times of actual transmission of the non-skipped SPS PDSCH among the N SPS PDSCH resources; and generate a bitmap with M bits, where in the bitmap with the M bits, a location at the non-skipped SPS PDSCH and corresponding to the NACK feedback corresponds to a first mark, and other locations of the bitmap correspond to a second mark.

In an example, the reporting module 1020 may be further configured to obtain transmission power of each non-skipped SPS PDSCH among the N SPS PDSCH resources; and judge that actual transmission is performed once in response to the transmission power of each non-skipped SPS PDSCH being greater than a preset threshold.

In an example, the reporting module 1020 may be further configured to obtain a demodulation reference signal (DMRS) of each non-skipped SPS PDSCH among the N SPS PDSCH resources; and obtain the number M of times of actual transmission according to the demodulation reference signal (DMRS) of each non-skipped SPS PDSCH.

In an example, M is obtained by the network device through explicit indication.

In an example, M is obtained by the network device through implicit indication.

In an example, M is determined through a feedback timing parameter K1 value corresponding to an SPS PDSCH of actual transmission.

According to the apparatus for transmitting the HARQ 1000 in the example of the disclosure, the plurality of SPS PDSCH resources are received through the UE; and joint reporting is performed from among the plurality of SPS PDSCH resources by using N as the granularity. Since jointly reporting HARQ-ACK feedback is performed from among the plurality of SPS PDSCH resources by using N as the granularity, a reduction in HARQ-ACK feedback overhead is facilitated.

It is to be noted that the above possible implementations may be executed independently, or be executed in a combining mode, which is not limited in the example of the disclosure.

Corresponding to the method for transmitting the HARQ in the above example in FIG. 9, the disclosure further provides the apparatus for transmitting the HARQ. The apparatus for transmitting the HARQ provided in the example of the disclosure corresponds to the method for transmitting the HARQ provided in the above example in FIG. 9, so an implementation of the method for transmitting the HARQ is also suitable for the apparatus for transmitting the HARQ provided by the example of the disclosure, which is not described in detail in the example of the disclosure.

Figure 11:
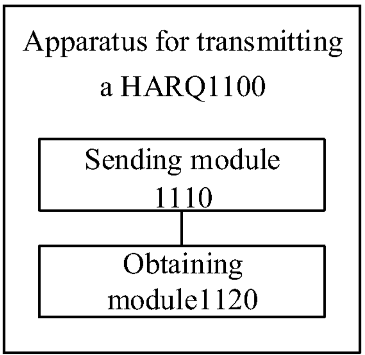
FIG. 11 is a schematic structural diagram of an apparatus for transmitting a HARQ provided by an example of the disclosure.

FIG. 11 is a schematic structural diagram of an apparatus for transmitting a HARQ 1100 provided by an example of the disclosure. The apparatus 1100 may be applied to a network-side device. As shown in FIG. 11, the apparatus 1100 for transmitting the HARQ may include: a sending module 1110 and an obtaining module 1120.

The sending module 1110 is configured to send a plurality of downlink semi-persistent scheduling physical downlink shared channel (SPS PDSCH) resources to UE.

The obtaining module 1120 is configured to obtain feedback information of performing joint reporting from among the plurality of SPS PDSCH resources by using N as the granularity, where N is a positive integer greater than 1.

In an example, the apparatus 1100 for transmitting the HARQ may further include: a grouping module configured to perform grouping binding on the N SPS PDSCH resources.

In an example, N is stipulated by a protocol and is one or more candidate values.

In an example, the apparatus 1100 for transmitting the HARQ may further include: a determining module configured to determine N in an explicit indication mode.

In an example, the determining module may be further configured to send a candidate value set to the UE, where the candidate value set includes a plurality of candidate values; and send first configuration signaling to the UE, where the first configuration signaling is used for selecting N from the plurality of candidate values.

In an example, N has various types of indication granularity.

In an example, the first configuration signaling is used for indicating one or more UE, where the one or more UE includes at least one of the following: a single SPS PDSCH configuration of single UE; the single UE; a plurality of UE in a group; or a plurality of UE in a cell.

In an example, N is determined through implicit indication.

According to the method for transmitting the HARQ in the example of the disclosure, the network device sends the plurality of SPS PDSCH resources to the UE, and then obtains the information of performing joint reporting from among the plurality of SPS PDSCH resources by using N as the granularity.

According to the apparatus for transmitting the HARQ 1100 in the example of the disclosure, the network device sends the plurality of SPS PDSCH resources to the UE, and then obtains the feedback information of performing joint reporting from among the plurality of SPS PDSCH resources by using N as the granularity. Thus, the UE binds the SPS PDSCH resources, so that the SPS PDSCH HARQ-ACK feedback overhead is reduced.

It is to be noted that the above possible implementations may be executed independently, or be executed in a combining mode, which is not limited in the example of the disclosure.

In order to implement the above example, the disclosure further provides a communication device. The communication device provided by the example of the disclosure includes a processor, a transceiver, a memory, and an executable program stored on the memory and able to be run by the processor, where the processor, when running the executable program, executes the above method. The communication device is the above terminal device, access network device or core network device.

The processor may include various types of storage media, and the storage medium is a non-transitory computer storage medium and may continue memorizing information stored after the communication device has a power failure. Here, the communication device includes a terminal device, an access network device or a core network device. The processor may be connected with the memory through a bus and the like and configured to read the executable program stored on the memory, for example, at least one in FIG. 1 to FIG. 9.

In order to implement the above example, the disclosure further provides a non-transitory computer-readable storage medium. The computer storage medium provided by the example of the disclosure stores an executable program, and the executable program, after being executed by a processor, may implement the above method for transmitting the HARQ, for example, at least one in FIG. 1 to FIG. 9.

Figure 12:
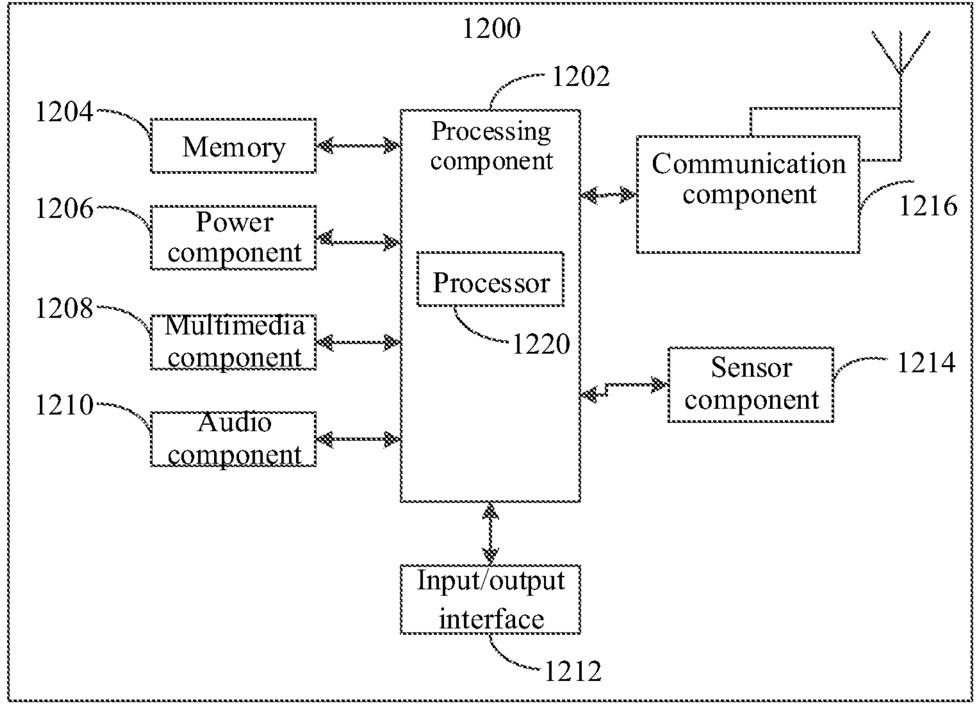
FIG. 12 is a block diagram of user equipment provided by an example of the disclosure.

FIG. 12 is a block diagram of user equipment 1200 provided by an example of the disclosure. For example, the user equipment 1200 may be a mobile phone, a computer, digital broadcast user equipment, a messaging device, a game console, a tablet device, a medical device, a fitness facility, a personal digital assistant, and the like.

Referring to FIG. 12, the user equipment 1200 may include at least one component as follows: a processing component 1202, a memory 1204, a power component 1206, a multimedia component 1208, an audio component 1210, an input/output (I/O) interface 1212, a sensor component 1214, and a communication component 1216.

The processing component 1202 generally controls the whole operation of the user equipment 1200, such as operations related to display, phone call, data communication, camera operation, and recording operation. The processing component 1202 may include at least one processor 1220 for executing instructions so as to complete all or part of the steps of the above method. Besides, the processing component 1202 may include at least one module to facilitate interaction between the processing component 1202 and the other components. For example, the processing component 1202 may include a multimedia module so as to facilitate interaction between the multimedia component 1208 and the processing component 1202.

The memory 1204 is configured to store various types of data so as to support operations on the user equipment 1200. Instances of these data include instructions of any application program or method for operation on the user equipment 1200, contact person data, telephone directory data, messages, pictures, videos, and the like. The memory 1204 may be implemented by any type of volatile or non-volatile storage device or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disc.

The power component 1206 provides power for various components of the user equipment 1200. The power component 1206 may include a power management system, at least one power source, and other components related to power generation, management and distribution for the user equipment 1200.

The multimedia component 1208 includes a screen that provides an output interface between the user equipment 1200 and a user. In some examples, the screen may include a liquid crystal display (LCD) and a touch panel (TP). If the screen includes the touch panel, the screen may be implemented as a touch screen so as to receive an input signal from the user. The touch panel includes at least one touch sensor so as to sense touching, swiping and gestures on the touch panel. The touch sensor can not only sense a boundary of a touching or swiping action, but also detect the wake-up time and pressure related to a touching or swiping operation. In some examples, the multimedia component 1208 includes a front camera and/or a back camera. When the user equipment 1200 is in an operation mode, such as a photographing mode or a video mode, the front camera and/or the back camera may receive external multimedia data. Each front camera and each back camera may be a fixed optical lens system or have a focal length and an optical zoom capability.

The audio component 1210 is configured to output and/or input an audio signal. For example, the audio component 1210 includes a microphone (MIC). When the user equipment 1200 is in the operation mode, such as a call mode, a recording mode, and a voice recognition mode, the microphone is configured to receive an external audio signal. The received audio signal may be further stored in the memory 1204 or sent via the communication component 1216. In some examples, the audio component 1210 further includes a speaker for outputting the audio signal.

The I/O interface 1212 provides an interface between the processing component 1202 and a peripheral interface module, and the above peripheral interface module may be a keyboard, a click wheel, buttons, and the like. These buttons may include, but are not limited to: a home button, a volume button, a start button, and a lock button.

The sensor component 1214 includes at least one sensor, configured to provide state evaluation of various aspects for the user equipment 1200. For example, the sensor component 1214 may detect a start/shut-down state of the user equipment 1200 and relative positioning of the components, for example, the components are a display and a keypad of the user equipment 1200. The sensor component 1214 may further detect location change of the user equipment 1200 or one component of the user equipment 1200, whether there is contact between the user and the user equipment 1200, azimuth or speed up/speed down of the user equipment 1200, and temperature change of the user equipment 1200. The sensor component 1214 may include a proximity sensor, configured to detect the existence of a nearby object without any physical contact. The sensor component 1214 may further include an optical sensor, such as a CMOS or CCD image sensor, for use in an imaging application. In some examples, the sensor component 1214 may further include an acceleration sensor, a gyroscope sensor, a magnetic sensor, a pressure sensor or a temperature sensor.

The communication component 1216 is configured to facilitate wired or wireless communication between the user equipment 1200 and other devices. The user equipment 1200 may access a wireless network based on a communication standard, such as WiFi, 2G or 3G, or their combination. In an example, the communication component 1216 receives a broadcast signal or related broadcast information from an external broadcast management system via a broadcast channel. In an example, the communication component 1216 further includes a near-field communication (NFC) module so as to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an example, the user equipment 1200 may be implemented by at least one application specific integrated circuit (ASIC), digital signal processor (DSP), digital signal processing device (DSPD), programmable logic device (PLD), field-programmable gate array (FPGA), controller, micro control unit, microprocessor or other electronic elements for executing the above method for transmitting the HARQ in any example in FIG. 1 to FIG. 9.

In an example, a non-transitory computer-readable storage medium including instructions is further provided, such as a memory 1204 including the instructions. The above instructions may be executed by a processor 1220 of user equipment 1200 so as to complete the above method. For example, the non-transitory computer-readable storage medium may be an ROM, a random access memory (RAM), a CD-ROM, a magnetic tape, a floppy disk, an optical data storage device and the like.

Figure 13:
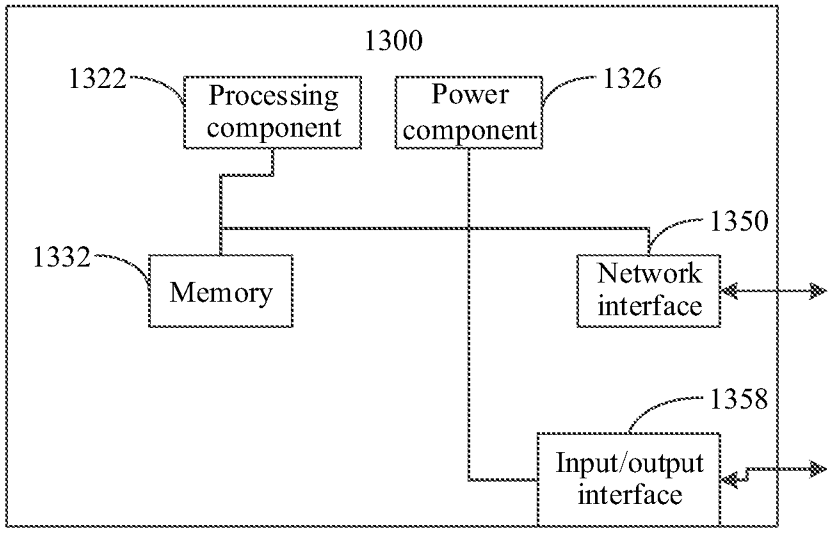
FIG. 13 is a schematic structural diagram of a network device provided by an example of the disclosure.

As shown in FIG. 13 which is a schematic structural diagram of a network device 1300 provided by an example of the disclosure. The network device may be the access network device or the core network device in the above example. Referring to FIG. 13, the network device1300 includes a processing component 1322 which further includes at least one processor (not shown) and a memory resource represented by a memory 1332, configured to store an instruction able to be executed by the processing component 1322, for example, an application program. The application program stored in the memory 1332 may include one or more modules each of which corresponds to a set of instructions. Besides, the processing component 1322 is configured to execute the instructions so as to execute any method applied to the access network device or the core network device as described above, for example, the method for transmitting the HARQ shown in FIG. 9.

The network device 1300 may further include a power component 1326 configured to execute power management of the network device 1300, a wired or wireless network interface 1350 configured to connect the network device 1300 to a network, and an input/output (I/O) interface 1358. The network device 1300 may operate an operating system stored in the memory 1332, for example, Windows Server™, Mac OS X™, Unix™, Linux™, FreeBSD™, or the like.

Additional Non-Limiting Embodiments of the Disclosure Include:

1. A method for transmitting a hybrid automatic repeat request (HARQ), performed by user equipment (UE) and including: receiving a plurality of downlink semi-persistent scheduling physical downlink shared channel (SPS PDSCH) resources; and performing joint reporting from among the plurality of SPS PDSCH resources by using N as granularity, wherein N is a positive integer greater than 1.
2. The method according to embodiment 1, grouping binding is performed on the N SPS PDSCH resources by a network device.
3. The method according to embodiment 1 or 2, the N is stipulated by a protocol and is one or more candidate values.
4. The method according to embodiment 1 or 2, the N is determined by the network device through explicit indication.
5. The method according to embodiment 4, determining the N by the network-side device through explicit indication includes: receiving a candidate value set sent by the network device, the candidate value set includes a plurality of candidate values; and receiving first configuration signaling sent by the network device, and selecting N from the plurality of candidate values according to the first configuration signaling.

6. The method according to embodiment 4, the N has various types of indication granularity.

7. The method according to embodiment 6, the first configuration signaling is used for indicating one or more UE, the one or more UE includes at least one of the following: a single SPS PDSCH configuration of a single UE; the single UE; a plurality of UE in one group; or a plurality of UE in a cell.

8. The method according to embodiment 1 or 2, the N is determined through implicit indication.

9. The method according to embodiment 8, determining N through implicit indication, includes: obtaining a cycle of the SPS PDSCH resources; and determining N according to the cycle of the SPS PDSCH resources.

10. The method according to embodiment 8, determining N through implicit indication includes: obtaining a location of a physical uplink control channel (PUCCH) resource; and indicating N according to the location of the PUCCH resource.

11. The method according to any one of embodiments 1 to 10, performing joint reporting from among the plurality of SPS PDSCH resources by using N as the granularity, includes: performing joint reporting for a negative-acknowledgement (NACK) feedback corresponding to a non-skipped SPS PDSCH resource among the N SPS PDSCH resources.

12. The method according to embodiment 11, reporting is skipped for a negative-acknowledgement (NACK) feedback corresponding to a skipped SPS PDSCH resource and an ACK feedback corresponding to the non-skipped SPS PDSCH among the N SPS PDSCH resources.

13. The method according to any one of embodiments 1 to 12, performing joint reporting from among the plurality of SPS PDSCH resources by using N as the granularity, includes: performing joint reporting for feedbacks of the N SPS PDSCH resources in a bitmap mode.

14. The method according to embodiment 13, among the N SPS PDSCH resources, each SPS PDSCH corresponds to one bit in the bitmap, a location at the non-skipped SPS PDSCH and corresponding to the NACK feedback corresponds to a first mark, and other locations correspond to a second mark, the first mark is different from the second mark.

15. The method according to any one of embodiments 1 to 12, performing joint reporting from among the plurality of SPS PDSCH resources by using N as the granularity includes: reporting a location index of a NACK feedback in response to the NACK feedback of the non-skipped SPS PDSCH occurring one time among the N SPS PDSCH resources; and performing reporting according to a preset format in response to the NACK feedback of the non-skipped SPS PDSCH occurring many times among the N SPS PDSCH resources.

16. The method according to any one of embodiments 1 to 12, performing joint reporting by selecting feedbacks of the N SPS PDSCH resources from among the plurality of SPS PDSCH resources includes: obtaining the number M of times of actual transmission of the non-skipped SPS PDSCH among the N SPS PDSCH resources; and reporting a location index of the NACK feedback in response to the NACK feedback occurring one time among the M times of actual transmission of the non-skipped SPS PDSCH; and performing reporting according to a preset format in response to the NACK feedback occurring many times among the M times of actual transmission of the non-skipped SPS PDSCH.

17. The method according to embodiment 13, performing joint reporting for the feedbacks of the N SPS PDSCH resources in a bitmap mode includes: obtaining the number M of times of actual transmission of the non-skipped SPS PDSCH among the N SPS PDSCH resources; and generating a bitmap with M bits, in the bitmap with the M bits, a location at the non-skipped SPS PDSCH and corresponding to the NACK feedback corresponds to a first mark, and other locations of the bitmap correspond to a second mark.

18. The method according to embodiment 16 or 17, obtaining the number M of times of actual transmission of the non-skipped SPS PDSCH among the N SPS PDSCH resources, includes: obtaining transmission power of each non-skipped SPS PDSCH among the N SPS PDSCH resources; and judging that actual transmission is performed once in response to the transmission power of each non-skipped SPS PDSCH being greater than a preset threshold.

19. The method according to embodiment 16 or 17, obtaining the number M of times of actual transmission of the non-skipped SPS PDSCH among the N SPS PDSCH resources includes: obtaining a demodulation reference signal (DMRS) of each non-skipped SPS PDSCH among the N SPS PDSCH resources; and obtaining the number M of times of actual transmission according to the demodulation reference signal (DMRS) of each non-skipped SPS PDSCH.

20. The method according to embodiment 16 or 17, the M is obtained by the network device through explicit indication.

21. The method according to embodiment 16 or 17, the M is obtained by the network device through implicit indication.

22. The method according to embodiment 21, the M is determined through a feedback timing parameter K1 value corresponding to an SPS PDSCH of actual transmission.

23. A method for transmitting a hybrid automatic repeat request (HARQ), performed by a network device and including: sending a plurality of downlink semi-persistent scheduling physical downlink shared channel (SPS PDSCH) resources to UE; and obtaining feedback information of performing joint reporting from among the plurality of SPS PDSCH resources by using N as granularity, wherein N is a positive integer greater than 1.

24. The method according to embodiment 23, including: performing grouping binding on the N SPS PDSCH resources.

25. The method according to embodiment 23 or 24, the N is stipulated by a protocol and is one or more candidate values.

26. The method according to embodiment 23 or 24, further including: determining N in an explicit indication mode.

27. The method according to embodiment 26, wherein determining N in an explicit indication mode includes:

sending a candidate value set to the UE, the candidate value set includes a plurality of candidate values; and sending first configuration signaling to the UE, the first configuration signaling is used for selecting N from the plurality of candidate values.

28. The method according to embodiment 25, the N has various types of indication granularity.

29. The method according to embodiment 28, first configuration signaling is used for indicating one or more UE, where the one or more UE includes at least one of the following: a single SPS PDSCH configuration of a single UE; the single UE; a plurality of UE in one group; or a plurality of UE in a cell.

30. The method according to embodiment 23 or 24, the N is determined through implicit indication.

31. An apparatus for transmitting a hybrid automatic repeat request (HARQ), applied to UE and including: a receiving module, configured to transmit the hybrid automatic repeat request (HARQ); and a reporting module, configured to perform joint reporting from among the plurality of SPS PDSCH resources by using N as granularity, wherein N is a positive integer greater than 1.

32. An apparatus for transmitting a hybrid automatic repeat request (HARQ), applied to a network device and including: a sending module, configured to send a plurality of downlink semi-persistent scheduling physical downlink shared channel (SPS PDSCH) resources to UE; and an obtaining module, configured to obtain information of performing joint reporting from among the plurality of SPS PDSCH resources by using N as granularity, wherein N is a positive integer greater than 1.

33. A communication device, including: a transceiver; a memory; and a processor, connected with the transceiver and the memory respectively, configured to control wireless signal transceiving of the transceiver by executing a computer executable instruction on the memory and able to implement the method for transmitting the hybrid automatic repeat request (HARQ) according to any one of embodiments 1 to 22, or 23 to 30.

34. A non-transitory computer-readable storage medium, wherein the computer storage medium stores a computer executable instruction, and the computer executable instruction, after being executed by a processor, is able to implement the method for transmitting the hybrid automatic repeat request (HARQ) according to any one of embodiments 1 to 22, or 23 to 30.

Those skilled in the art will easily figure out other implementation solutions of the disclosure after considering the specification and practicing the disclosure disclosed here. The disclosure intends to cover any variation, use or adaptive change of the disclosure, and these variations, uses, or adaptive changes conform to a general principle of the disclosure and include common general knowledge or conventional technical means in the technical field not disclosed by the disclosure. The specification and the examples are merely regarded as examples, and the true scope and spirit of the disclosure are indicated by the following claims.

It is to be understood that the disclosure is not limited to an accurate structure described above and shown in the accompanying drawings, and various modifications and changes may be made without departing from its scope. The scope of the disclosure is limited merely by appended claims.

What is claimed is:

1. A method for transmitting a hybrid automatic repeat request (HARQ), performed by user equipment (UE) and comprising:

receiving a plurality of downlink semi-persistent scheduling physical downlink shared channel (SPS PDSCH) resources; and performing joint reporting from among the plurality of SPS PDSCH resources by using N as granularity, wherein the N is a positive integer greater than 1;

wherein performing joint reporting from among the plurality of SPS PDSCH resources by using the N as the granularity comprises:

obtaining M times, wherein the M times is a number of times of actual transmission of non-skipped SPS PDSCH among the N of the plurality of SPS PDSCH resources; and reporting a location index of a NACK feedback in response to the NACK feedback occurring one time among the M times; and performing reporting according to a preset format in response to the NACK feedback occurring many times among the M times, wherein the M times is obtained through implicit indication, wherein the M times is determined through a feedback timing parameter K1 value corresponding to one of the plurality of SPS PDSCH resources of an actual transmission.

2. The method according to claim 1, wherein grouping binding is performed on the N of the plurality of SPS PDSCH resources by a network device.

3. The method according to claim 1, wherein the N is determined in one of the following ways:

the N is stipulated by a protocol and there are one or more candidate values;

the N is determined through an explicit indication; or the N is determined through an implicit indication.

4. The method according to claim 3, wherein determining the N through the explicit indication comprises:

receiving a candidate value set sent by a network device, wherein the candidate value set comprises a plurality of candidate values; and receiving first configuration signaling sent by the network device, and selecting the N from the plurality of candidate values according to the first configuration signaling.

5. The method according to claim 3, wherein the N has various types of indication granularity.

6. The method according to claim 4, wherein the first configuration signaling is configured to indicate one or more UEs, wherein the one or more UEs comprise at least one of the following:

a single SPS PDSCH configuration of a single UE;

the single UE;

a plurality of UEs in one group; or a plurality of UEs in a cell.

7. The method according to claim 3, wherein determining the N through the implicit indication comprises:

obtaining a cycle of the SPS PDSCH resources; and determining the N according to the cycle of the SPS PDSCH resources; or obtaining a location of a physical uplink control channel (PUCCH) resource; and indicating the N according to the location of the PUCCH resource.

8. The method according to claim 1, wherein performing joint reporting from among the plurality of SPS PDSCH resources by using the N as the granularity further comprises at least one of the following actions:

performing joint reporting for a negative-acknowledgement (NACK) feedback corresponding to a non-skipped SPS PDSCH resource among the N of the plurality of SPS PDSCH resources;

performing joint reporting for feedbacks of the N of the plurality of SPS PDSCH resources in a bitmap mode; or reporting a location index of the NACK feedback in response to the NACK feedback of the non-skipped SPS PDSCH occurring one time among the N of the plurality of SPS PDSCH resources; and performing reporting according to a preset format in response to the NACK feedback of the non-skipped SPS PDSCH occurring many times among the N of the plurality of SPS PDSCH resources.

9. The method according to claim 8, wherein reporting is skipped for a negative-acknowledgement (NACK) feedback corresponding to a skipped SPS PDSCH resource and an acknowledgement (ACK) feedback corresponding to the non-skipped SPS PDSCH among the N of the plurality of SPS PDSCH resources.

10. The method according to claim 8, wherein among the N of the plurality of SPS PDSCH resources, each SPS PDSCH corresponds to one bit in the bitmap, a location at the non-skipped SPS PDSCH and corresponding to the NACK feedback corresponds to a first mark, and other locations correspond to a second mark, wherein the first mark is different from the second mark.

11. The method according to claim 8, wherein performing joint reporting for the feedbacks of the N of the plurality of SPS PDSCH resources in a bitmap mode comprises:

obtaining the M times; and generating a bitmap with M bits, wherein in the bitmap with the M bits, a location at the non-skipped SPS PDSCH and corresponding to the NACK feedback corresponds to a first mark, and other locations of the bitmap correspond to a second mark.

12. The method according to claim 8, wherein obtaining the M times comprises:

obtaining transmission power of each non-skipped SPS PDSCH among the N of the plurality of SPS PDSCH resources; and judging that an actual transmission is performed once in response to the transmission power of each non-skipped SPS PDSCH being greater than a preset threshold; or obtaining a demodulation reference signal (DMRS) of each non-skipped SPS PDSCH among the N of the plurality of SPS PDSCH resources; and obtaining the M times of an actual transmission according to the demodulation reference signal (DMRS) of each non-skipped SPS PDSCH.

13. The method according to claim 1, wherein the M times is further obtained through explicit indication.

14. A method for receiving a hybrid automatic repeat request (HARQ), performed by a network device and comprising:

sending a plurality of downlink semi-persistent scheduling physical downlink shared channel (SPS PDSCH) resources to user equipment (UE); and obtaining feedback information of the UE performing joint reporting from among the plurality of SPS PDSCH resources by using N as granularity, wherein the N is a positive integer greater than 1;

wherein the UE performing joint reporting from among the plurality of SPS PDSCH resources by using N comprises:

obtaining M times, wherein the M times is a number of times of actual transmission of non-skipped SPS PDSCH among the N of the plurality of SPS PDSCH resources; and reporting a location index of a NACK feedback in response to the NACK feedback occurring one time among the M times; and performing reporting according to a preset format in response to the NACK feedback occurring many times among the M times, wherein the M times is obtained through implicit indication, wherein the M times is determined through a feedback timing parameter K1 value corresponding to one of the plurality of SPS PDSCH resources of an actual transmission.

15. The method according to claim 14, comprising:

performing grouping binding on the N of the plurality of SPS PDSCH resources.

16. The method according to claim 14, wherein the N is determined in one of the following ways:

the N is stipulated by a protocol and there are one or more candidate values;

determining the N in an explicit indication mode; or the N is determined through an implicit indication.

17. The method according to claim 16, wherein determining the N in the explicit indication mode comprises:

sending a candidate value set to the UE, wherein the candidate value set comprises a plurality of candidate values; and sending first configuration signaling to the UE, wherein the first configuration signaling is used for selecting N from the plurality of candidate values.

18. A communication device, comprising: a transceiver; a memory; and a processor, communicatively connected with the transceiver and the memory respectively and configured to control wireless signal transceiving of the transceiver by executing a computer executable instruction on the memory and to implement:

receiving a plurality of downlink semi-persistent scheduling physical downlink shared channel (SPS PDSCH) resources; and performing joint reporting from among the plurality of SPS PDSCH resources by using N as granularity, wherein the N is a positive integer greater than 1;

wherein performing joint reporting from among the plurality of SPS PDSCH resources by using the N as the granularity comprises:

obtaining M times, wherein the M times is a number of times of actual transmission of non-skipped SPS PDSCH among the N of the plurality of SPS PDSCH resources; and reporting a location index of a NACK feedback in response to the NACK feedback occurring one time among the M times; and performing reporting according to a preset format in response to the NACK feedback occurring many times among the M times, wherein the M times is obtained through implicit indication, wherein the M times is determined through a feedback timing parameter K1 value corresponding to one of the plurality of SPS PDSCH resources of an actual transmission.

19. A communication device, comprising:

a transceiver;

a memory; and a processor communicatively connected with the transceiver and the memory respectively, and configured to control wireless signal transceiving of the transceiver by executing a computer executable instruction on the memory to implement the method for receiving the hybrid automatic repeat request (HARQ) according to claim 14.

* * * * *